United States Patent Office 3,639,648
Patented Feb. 1, 1972

3,639,648
IMPROVEMENTS IN CATALYSTS
Thomas Nicklin, Middleton, Manchester, Frederick Farrington, Sale, and James Houghton, Bramhall, England, assignors to The Gas Council, London, England
No Drawing. Filed Mar. 17, 1969, Ser. No. 807,930
Claims priority, application Great Britain, Apr. 4, 1968, 16,350/68
Int. Cl. B01j *11/32, 11/06*
U.S. Cl. 252—465                                         9 Claims

ABSTRACT OF THE DISCLOSURE

A catalyst composition particularly suitable for the reforming or treatment of hydrocarbons comprises nickel oxide, triuranium actoxide $U_3O_8$ and includes a compound of an alkali metal, which compound is in the form of an alkali metal uranate. In one method of manufacturing the catalyst shaped carriers are impregnated with a solution of salts of nickel uranium and alkali metal compound in a weak acid at a temperature below the decomposition temperature of the compound and the carriers are subsequently calcined at a temperature sufficient to form a uranate of said compound.

BACKGROUND OF THE INVENTION

The invention relates to catalysts particularly suitable for use in the reforming and subsequent treatment of hydrocarbons.

The invention also relates to methods of manufacturing such catalysts.

SUMMARY OF THE INVENTION

According to the invention there is provided a catalyst composition which comprises nickel oxide, triuranium octoxide $U_3O_8$ and includes a compound of an alkali metal which compound is in the form of an alkali metal uranate.

Also according to the invention there is provided a catalyst composition effective in the reforming of hydrocarbons which comprises nickel oxide, triuranium-octoxide, $U_3O_8$ and includes a compound of an alkali metal, which compound is at least partly decomposed during calcination to yield a reactive source of the alkali metal suitable for the formation of an alkali metal uranate at the calcination temperature.

In one method of producing catalysts in accordance with the invention, shaped carriers of alumina or spinel are impregnated with a solution of salts of nickel, uranium and alkali metal compound in a weak acid, said solution being maintained at a temperature below the decomposition temperature of the said compound and said carriers are subsequently calcined at a temperature sufficient to form a uranate of said compound.

Preferably the alkali metal compound comprises a potassium salt and the solution comprises nickel and uranyl nitrates and potassium acetate. The solution may be maintained at about 80° C. during the impregnation step and the carriers subsequently calcined at about 350° C.–650° C.

In an alternative method of preparing catalyst the shaped carriers may be impregnated with a solution of salts of nickel and uranium, calcined, and subsequently dipped in a bath containing potassium uranate in a suitable solvent.

Preferably the solvent may comprise acetic acid or an aquaeous solution of ammonium carbonate. The bath may be maintained at around 80° C. and the dipping step may be followed by drying at 250° C.

To enable the nature of the invention to be more readily understood various methods of preparing the catalyst will now be described solely by way of example.

DESCRIPTION OF THE PREFERRED EMBODIMENT

Example I

Spheres, extruded cylinders, rings or other shaped supports may be used but in the particular example rings of a fired alumina (15 mm. x 15 mm. x 6 mm. hole) are first heated in a retort to dry out absorbed moisture and are then soaked for 20 minutes at around 80° C. in a solution of nickel and uranyl nitrates and potassium acetate. A convenient method of preparing a suitable solution is by melting together three parts of nickel nitrate to one part of uranyl nitrate and 0.02 part of potassium acetate by weight. With water added, the solution analysis should indicate a nickel content of about 250 grams per litre. After soaking the supports are drained for 15 minutes and fired at 500° C. for 3 hours in a stream of air. The process is repeated until the final composition of the catalyst is nickel 8.6%, uranium 7.2%, potassium 0.16%.

On subsequent test steam was passed over the catalyst and the resultant condensate analysed. No potassium was detected.

If desired the impregnating solution may comprise a mixture of nickel nitrate, uranyl nitrate and potassium nitrate in a suitable solvent for example acetic acid.

Example II

Alumina rings (15 mm. x 15 mm. x 6 mm.) are dried, dipped in a melt of nickel and uranyl nitrates and subsequently calcined. The rings are dipped in a solution of potassium uranate and acetic acid, maintained at about 80° C. and then dried at about 250° C.

If desired the said dipping solution may comprise potassium di-uranate and ammonium carbonate.

We claim:

1. A catalyst composition consisting essentially of nickel oxide, triuranium octoxide and alkali metal uranate, each of said components being present in an amount with respect to the other that forms a catalyst composition effective in the reforming of hydrocarbons.

2. The catalyst composition of claim 1 wherein the alkali metal uranate is potassium uranate.

3. A method of producing a catalyst which comprises impregnating a shaped carrier of alumina or spinel with a solution of nickel, uranium and alkali metal salts and calcining the impregnated carrier to provide a catalyst composition consisting of nickel oxide, triuranium octoxide and alkali metal uranate, each of said components being present in an amount with respect to the other that forms a catalyst composition effective in the reforming of hydrocarbons.

4. The method of claim 3 wherein the impregnant is a solution of a potassium salt, nickel nitrate and uranyl nitrate.

5. The method of claim 4 wherein the impregnating solution is maintained at a temperature of about 80° C. during the impregnation and the calcination is at a temperature within the range of 350° to 650° C.

6. A method of preparing a catalyst composition of claim 1 comprising impregnating a shaped alumina or spinel carrier with a solution of salts of nickel and uranium, calcining the impregnated carrier and subsequently dipping the resulting calcined carrier in a bath of potassium uranate to provide a catalyst composition consisting of essentially nickel oxide, triuranium octoxide and potassium uranate, each of said components being present in an amount with respect to the other that forms a catalyst composition effective in the reforming of hydrocarbons.

7. The method of claim 6 wherein said bath is a solution of potassium uranate in acetic acid.

8. The method of claim 6 wherein said bath is potassium uranate in aqueous ammonium carbonate.

9. The method of claim 6 wherein the bath is maintained at a temperature of about 80° C. and the dipping step is followed by drying at a temperature of about 250° C.

References Cited

UNITED STATES PATENTS 1,673,032   6/1928   Williams _____ 252—470

DANIEL E. WYMAN, Primary Examiner

P. M. FRENCH, Assistant Examiner

U.S. Cl. X.R.

252—470, 301.1